United States Patent
Bell

[15] 3,696,793
[45] Oct. 10, 1972

[54] STEAM BOILERS
[72] Inventor: Alan Bell, London, England
[73] Assignee: Foster Wheeler Corporation, Livingston, N.J.
[22] Filed: Sept. 23, 1970
[21] Appl. No.: 74,761

[30] Foreign Application Priority Data

Aug. 6, 1969   Great Britain..........39,468/69

[52] U.S. Cl..................122/4 D, 110/28 S, 165/104
[51] Int. Cl................................................F22b 1/02
[58] Field of Search....165/104; 122/4, 4 D; 110/285

[56] References Cited

UNITED STATES PATENTS

| | | | |
|---|---|---|---|
| 3,431,892 | 3/1969 | Godel | 122/4 |
| 2,729,428 | 1/1956 | Milmore | 122/4 X |
| 2,818,049 | 12/1957 | Blaskowski et al. | 122/4 X |
| 2,926,143 | 2/1960 | Leland | 122/4 X |

FOREIGN PATENTS OR APPLICATIONS 776,791   6/1957   Great Britain................122/4

Primary Examiner—Kenneth W. Sprague
Attorney—John Maier, III, Marvin A. Naigur and John E. Wilson

[57] ABSTRACT

This invention relates to steam boilers fired by fluidized bed burners. A small proportion of bed particles are entrained by the fluidizing gases and so these must be removed by separators so as to ensure that these particles do not form deposits on downstream parts of the boiler. According to the invention a number of centrifugal separators are provided above the bed in the path of the fluidizing gas, those separators being supported and cooled by steam- or water-carrying tubes. Because effective cooling of the separators can be achieved, this arrangement has the advantage that they can be positioned closely above the bed.

7 Claims, 3 Drawing Figures

PATENTED OCT 10 1972　　　　　　　　　　　　　　　　　　3,696,793

STEAM BOILERS

BACKGROUND OF THE INVENTION

The fluidized bed of a fluidized bed burner will normally comprise a loose bed of particles, most of which are ash particles and a few of which are coal particles, supported by a flow of combustion air which flows through the bed at sufficient velocity to support the particles. In practice the fluidized bed of particles behaves in a similar way to a boiling turbulent liquid. The coal particles burn in the air and, to support combustion, fresh coal particles are continuously added while, to maintain a substantially constant bed height, an overflow of particles is continuously withdrawn.

The heat produced by the burner can be used to produce steam in various ways. Preferably, however, steam raising or evaporating tubes are immersed in the bed so as to exploit the very high heat transfer rates which can be achieved between the bed and the tubes. Also this arrangement ensures satisfactory cooling of the bed so as to prevent its reaching the ash fusion temperature.

A small proportion of the bed particles are entrained by the fluidizing gases and so leave the bed. Some of these entrained particles may be unburnt coal particles and so this reduces the overall efficiency of the boiler. In addition the entrained particles are abrasive and so should desirably by removed from the gases as soon as possible.

In the case where the fluidized bed operates at a pressure above atmospheric pressure, the removal of the entrained particles assumes considerable importance because the hot fluidizing gases from the bed must be passed to a turbine for expansion and recovery of the energy used initially to compress them and the turbine can rapidly by damaged by the presence of entrained particles in the inlet gases.

It is, therefore an object of the invention to provide for the simple and effective removal of these entrained particles.

THE INVENTION

According to the invention there is provided a fluidized bed boiler in which a number of centrifugal separators are provided above the bed in the path of the fluidizing gas flow from the bed so that the gases from the bed must pass through the separators for removal of entrained particles, the separators being supported and cooled by means of evaporating and/or superheating and/or reheating tubes.

This arrangement has a number of advantages. Because the separators are cooled they can be positioned closely above the fluidized bed. Therefore, the entrained particles can be moved almost as soon as the gases leave the bed. Also because evaporating, superheating and/or reheating tubes are used to support the separators and these tubes can be extensions of tubes immersed in the bed or be tubes leading to or from banks of tubes immersed in the bed, special extra supports for the separators which might further interfere with the flow of gas or require expensive materials to withstand the high temperature prevailing close to the bed do not need to be provided.

The arrangement of the invention can also be comparatively compact and can therefore be positioned above the bed within the shell of the fluidized bed.

In accordance with one embodiment of the invention the separators pass through and are supported by one or more plates which in turn are supported by the evaporating, superheating and reheating tubes. These plates can be, for example, of triangular or sector shape and assembled together so as to form an inverted pyramidal arrangement above the bed, the separators being such that the separated particles fall onto the plates and slide under gravity to the point of the pyramidal arrangement from whence they can be removed through an outlet.

When the separators are supported on plates in this way, the cooling of the separators and the plates can be improved by making the plates from a finned tube panel, the separators being mounted in the fins and the tubes carrying cooling water or steam.

There are many centrifugal separators which are suitable. One particularly convenient form, which has a comparatively low pressure drop, comprises a cylindrical tube having at or near its inlet end a swirler blade or blades which imparts swirling motion to the gases and so throws entrained particles passing through the tube towards the cylindrical wall of the tube, and at or near its outlet end an annular deflector which deflects the particles thrown towards the cylindrical wall of the tube away from the axis of the tube and the cleaned gases.

BRIEF DESCRIPTION OF THE DRAWINGS

A fluidized bed steam boiler according to the invention will now be described, by way of example, with reference to the accompanying diagrammatic drawings, in which.

DESCRIPTION OF THE PREFERRED EMBODIMENT

Figure 1:
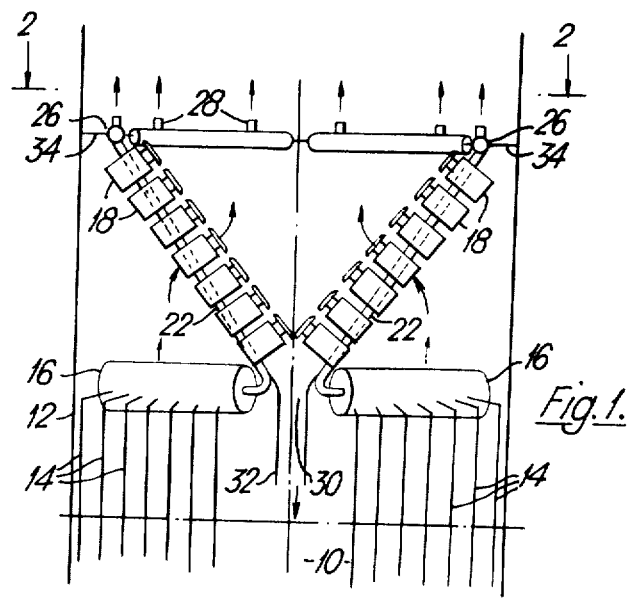
FIG. 1 is a axial sectional elevation of part of the boiler.
Figure 2:
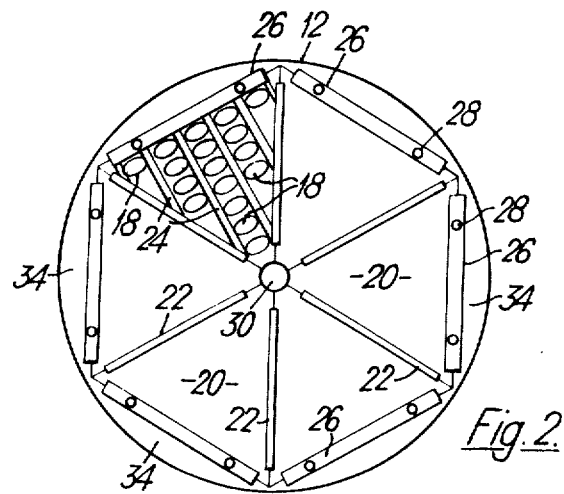
FIG. 2 is a plan section taken on the line 2—2 of FIG. 1.

The top part of the fluidized bed 10 of the steam boiler according to the invention is shown in FIG. 1. The bed is confined within a cylindrical casing 12 which can if desired be made up of suitable water tube panels.

Immersed in the bed are banks of upright tubes 14 which extend between upper outlet headers 16 and lower inlet headers (not shown). The tubes 14 are cooling tubes, such as evaporating tubes or alternatively some may be superheating and/or reheating tubes depending upon the actual design of the boiler.

During the operation of the fluidized bed some of the particles become entrained with the hot gases leaving the bed and it is important that these particles be removed from the gases. Therefore closely above the bed are positioned a large number of centrifugal separators 18 through which the hot gases leaving the bed must pass.

These separators 18 are supported by triangular plates 20 which, in turn, are supported by tubes 22. These tubes 22 constitute outlets from the headers 16 and feed the fluid from these headers to, for example, a steam and water drum or further steam heating stages depending upon the function of the tubres 14 connected to the headers 16. In the embodiment shown in the drawings all of the tubes 14 are evaporating tubes and, therefore, the tubes 22 lead the steam and water mixture from the headers 16 to a steam and water drum (not shown).

The tubes 22 are joined to the sides of the triangular plates 20 and therefore help to cool these plates 20 and the separators 18. In order to improve this cooling it is preferred that the plates 20 incorporate further tubes 24 leading from the tubes 22. Then, in effect, the triangular plate 20 can be considered to be made from finned tubes 24, the separators 28 extending through the fins.

All of the tubes 22 and 24 lead to a ring of collectors 26 which define the remaining edge of each triangular plate 20. These collectors have outlets 28 which lead to the steam and water drum (not shown).

There are six triangular plates 20 and these are assembled into the form of an inverted pyramid as shown. There could, however, be more or less plates depending upon the size of the casing 12. The separators 18 are such that separated particles fall onto the plates 20 and they then slide by gravity down to the point 30 of the pyramid. From the point 30, an outlet 32 leads, for example, down through the bed 10. The outlet 32 can join an overflow for the bed so that the separated particles are mixed with the spent bed particles and discharged. Alternatively, the outlet 32 can be kept separate so that the separated particles can be reintroduced into the bed and refired.

So as to ensure that the gases from the bed pass through the separators, the collectors 26 are joined to the wall of the casing 12 by segment plates 34.

Figure 3:
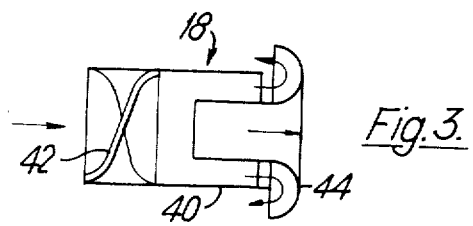
FIG. 3 is an enlarged cross-section of one of the centrifugal separators.

The separators 18 can of course be of any suitable type providing low pressure drop and effective separation. One particularly suitable separator 18 is shown in FIG. 3. The separator comprises a hollow cylinder 40 having at its inlet end stationary swirler blades 42 which cause gases passing through the cylinder 40 to swirl about the axis of the cylinder. Near the other end of the cylinder 40 is provided a hollow mushroom-shaped deflector 44. The swirling of the gases as they pass through the cylinder 40 causes entrained particles to be flung out towards the wall of the cylinder 40 and then the deflector 44 catches these particles and deflects them away from the main axial flow of gases through the cylinder and the separated particles drop onto the triangular plates 20.

During the working of the bed 10, the water in the tubes 14 absorbs heat and some is converted to steam. This mixture passes to the headers 16 from when it leaves through the tubes 22 supporting the plates 20. The mixture passes through the tubes 22 and some branches through the tubes 24 and finally the mixture is combined in the collectors 26. In passing through the tubes 22 and 24, the mixture absorbs more heat an so cools the plates 20 and the separators 18. From the collectors 26 the steam and water mixture passes to the steam and water down through the outlets 28.

The gases which fluidize the particles in the bed entrain a few particles. These particles are, however, removed by the separators 18 as the gas passes through them. The cleaned gas then passes up through the casing 12 for use in further heating stages (not shown) and/or in a turbine (not shown). The separator particles fall onto the plates 20 and slide down these to the outlet 32.

The arrangement of the separators has a number of advantages. Because they are positioned immediately above the bed the entrained particles are quickly removed from the gases. Therefore the gases are clean before they pass over, for example, convection heated tube blanks, e.g., further evaporating tubes, superheater and/or reheater tubes or economizer tubes, and so these tubes do not become encrusted with the particles with resulting risk of failure. Even though the separators are positioned closely above the bed they are kept cool by the tubes 22 and 24.

Entrained particles are effectively removed by the separators and therefore they cannot damage or wear by attrition downstream parts of the boiler including turbines when the bed is one operating at an elevated pressure.

Because many separators can be provided in a compact way the pressure drop caused by the separators can be kept acceptably low. Also, the compact arrangement of separators means that they can be provided within the casing 12. This arrangement is therefore economical to build.

Further, because the separators are supported by the tubes 22, which must in any case be provided, this ensures that the separate arrangement makes the minimum disturbance to the bed, besides of course, providing a simple and cheap structure.

To improve the efficiency of the boiler, the separated particles can be recycled to the bed so as to ensure complete combustion of the coal.

Although we have herein used the words "water" and "steam," these words are intended to embrace reference to any suitable liquid and its vapor unless the context specifically requires otherwise.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. In a fluidized bed steam boiler of the type having a fluidizable bed of combustible particles, means for supplying air to fluidize said particles whereby combustion of said combustible particles occurs and means for supplying fresh combustible particle to the bed and withdrawing spent combustible particles, in combination, a plurality of separators provided downstream of said bed of combustible particles, an inclined plate, said separators projecting through said plate, and fluid carrying cooling tubes adapted to be cooled by fluid which has absorbed heat created by the combustion of said combustible particles for the production of steam, said plate being supported by and in heat exchange contact with said fluid carrying cooling tubes.

2. The boiler defined in claim 1 in which some of said fluid carrying cooling tubes are adapted to carry fluid heated in tubes immersed in said bed of fluidized particles.

3. The boiler defined in claim 1 further comprising headers connected between said tubes immersed in said bed and said cooling tubes.

4. The boiler defined in claim 1 which said separators are centrifugal separators.

5. The boiler defined in claim 1 wherein said plates are of generally triangular shape and are each joined to two other of said plates at their edges to form an inverted pyramidal arrangement above said bed.

6. The boiler defined in claim 5 further comprising a particle outlet at the center of said inverted pyramidal arrangement, said separators being situated so that separated particles fall onto said plates and slide by gravity to said particle outlet.

7. The boiler defined in claim 1 wherein said separators comprise a cylindrical tube to direct gases therethrough, at least one swirler blade positioned in said tube adjacent the inlet thereof for imparting axial swirling motion to said gases passing through said tubes to thereby throw entrained particles outward and against said cylindrical wall of said tube, and an annular deflector adjacent said gas outlet end of said tube to deflect said particles thrown towards said cylindrical wall of said tube in a direction opposite to that said gases are moving and towards said plate.

* * * * *